(No Model.)　　　　　　F. SCHELP, Jr.　　　　　2 Sheets—Sheet 1.
VEHICLE SPRING.
No. 341,057.　　　　　　　　　　Patented May 4, 1886.
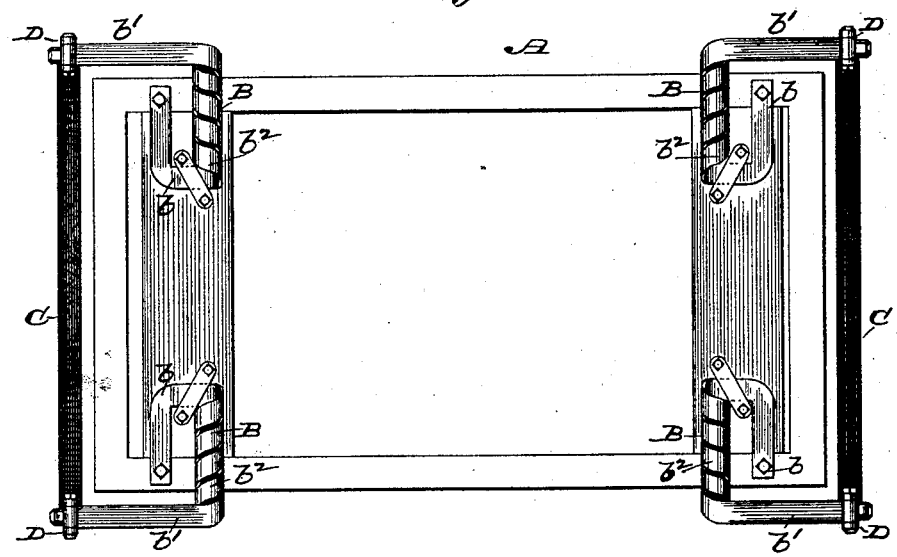
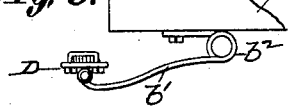
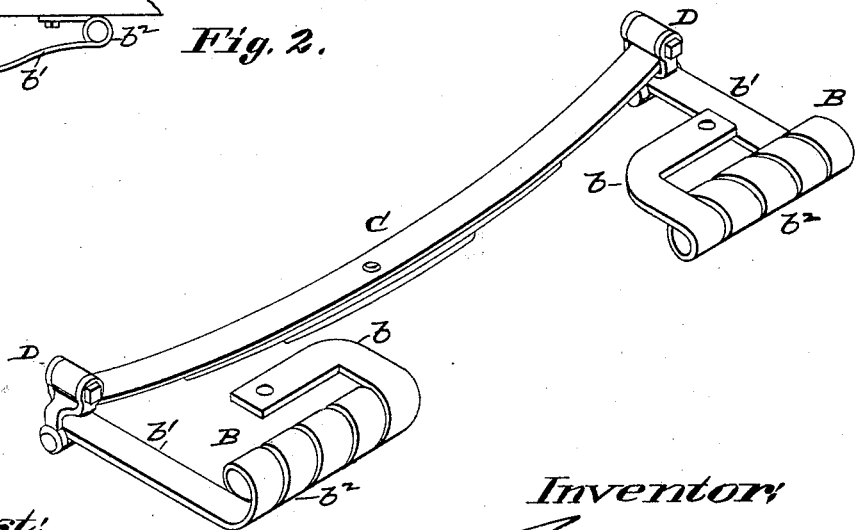
Attest:
J. W. Hoke.
F. L. Stoddard
Inventor:
Fred Schelp Jr.
by C. D. Moody
atty (No Model.) 2 Sheets—Sheet 2.
F. SCHELP, Jr.
VEHICLE SPRING.
No. 341,057. Patented May 4, 1886.
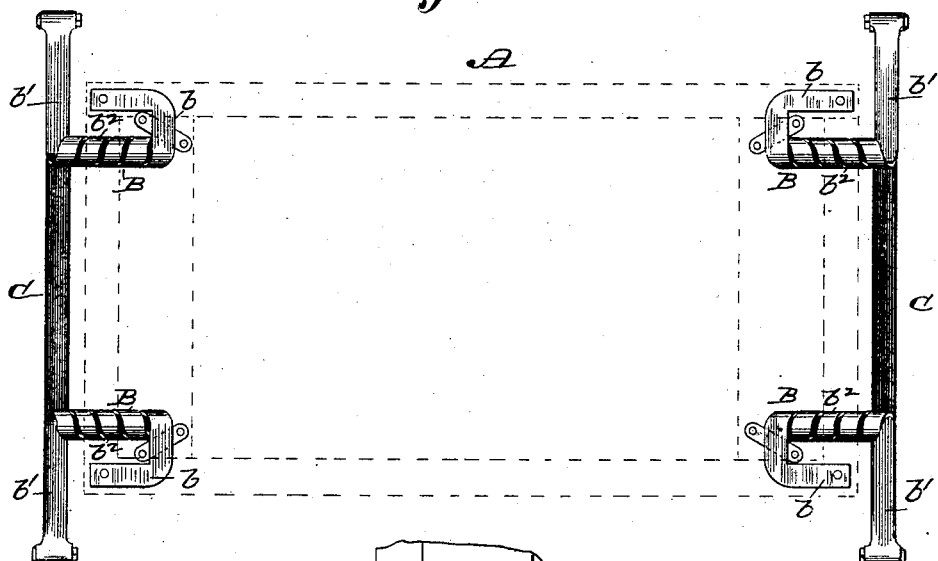
Fig. 5.
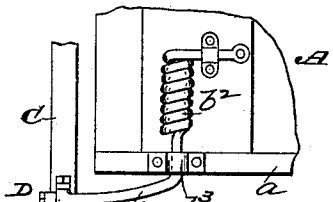
Fig. 4.
Fig. 6.
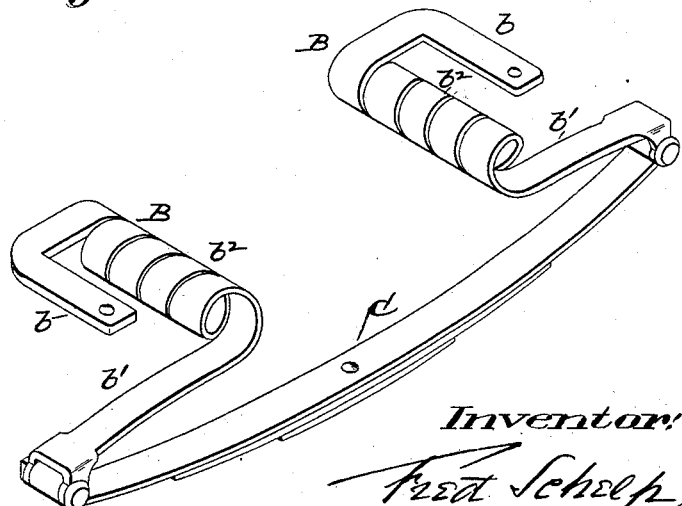
Attest:
J. W. Hoke.
J. L. Stoddard
Inventor:
Fred Schelp Jr.
by C. D. Moody
atty

UNITED STATES PATENT OFFICE.

FRED. SCHELP, JR., OF BALDWIN, MISSOURI.

VEHICLE-SPRING.

SPECIFICATION forming part of Letters Patent No. 341,057, dated May 4, 1886.

Application filed November 27, 1885. Serial No. 184,006. (No model.)

*To all whom it may concern:*

Be it known that I, FRED. SCHELP, Jr., of Baldwin, St. Louis county, Missouri, have made a new and useful Improvement in Vehicle-Springs, of which the following is a full, clear, and exact description.

The improved spring is composite, consisting of a coil-spring and a semi-elliptic spring, the coil-spring at one end being attached to the vehicle-body, and that the other end to the semi-elliptic spring, which in turn is supported by the vehicle-gear.

The annexed drawings, making part of this specification, exhibit the improvement.

Figure 1 is a bottom view of a vehicle-body having the improved spring attached. Fig. 2 is a view in perspective of the spring. Fig. 3 is a side elevation of the spring as attached to the body. Fig. 4 is a bottom view illustrating a desirable mode of attaching the coil-spring to the vehicle-body. Figs. 5 and 6 are respectively a bottom view and a view in perspective exhibiting a modification of the coil-spring.

The same letters of reference denote the same parts.

A represents a vehicle-body of a familiar form.

B, Figs. 1, 2, 3, represents the coil-spring. Its inner end is extended to form or is provided with a plate or bar, $b$, parallel with said spring, and by means of which, and substantially as is indicated in Fig. 1, the coil-spring is attached to the vehicle-body. The outer end of the coil-spring is also extended to form or is provided with a plate or bar, $b'$, at right angles with said plate, and by means of which, and substantially as shown, the coil-spring is attached to the semi-elliptic spring C, which extends crosswise with relation to the vehicle-body, substantially as shown.

The spring C may be attached in any suitable manner to the vehicle-gear, which is not shown in the drawings.

The shackle D is but one mode of connecting the two springs C B, and I desire not to be limited thereto. There are two of the springs B B attached to the spring C, and respectively at each side of the vehicle-body, and both ends of the vehicle-body are similarly attached to the vehicle-gear.

In Figs. 1, 2 the coil $b^2$ of the spring B is arranged parallel with the spring C, and the part $b'$ joins the spring C at right angles therewith.

In Figs. 5, 6 a modification of the construction is shown, the coil $b^2$ being arranged in the direction of the length of the vehicle-body, and the part $b'$ being parallel with the spring C.

Although the semi-elliptic is the most approved form of the spring C, I desire not to be confined thereto.

If desired, the vehicle may be provided with the usual side bars. They are, however, not shown, as they are not essential to the operation of the improvement.

Fig. 4 illustrates a desirable mode of attaching the coil-spring of Figs. 1, 2, 3. The coil $b^2$ stops short of the side $a$ of the vehicle-body, and the end $b'$ is journaled in the bearing $b^3$.

I am aware that heretofore a coiled spring having laterally-diverging curved torsion-arms, one attached to the body of the vehicle and the other to the side bar, is not new, and I do not herein claim the same.

I claim—

1. The combination of the vehicle-body A, the springs B B, and the semi-elliptical springs C, extending crosswise in relation to the vehicle-body, the said coil-springs being secured at one end to said body and at the other to the ends of the elliptical spring, substantially as described.

2. The combination of the coil-springs B B, each consisting of the plates $b$ $b'$ and coil $b^2$, said plate $b$ being parallel, and said plate $b'$ being at right angles, to the coil, with the vehicle-body A, the semi-elliptical spring C, and shackles D, substantially as described.

FRED. SCHELP, JR.

Witnesses:
C. D. MOODY,
GEO. H. SCHELP.